United States Patent
Chung

(10) Patent No.: US 9,577,490 B2
(45) Date of Patent: Feb. 21, 2017

(54) SPINDLE MOTOR

(71) Applicant: LG INNOTEK CO., LTD., Seoul (KR)

(72) Inventor: Hyun Seok Chung, Seoul (KR)

(73) Assignee: HITACHI-LG DATA STORAGE KOREA, INC., Seoul (KR)

( * ) Notice: Subject to any disclaimer, the term of this patent is extended or adjusted under 35 U.S.C. 154(b) by 469 days.

(21) Appl. No.: 13/713,104

(22) Filed: Dec. 13, 2012

(65) Prior Publication Data

US 2013/0162116 A1   Jun. 27, 2013

(30) Foreign Application Priority Data

Dec. 23, 2011   (KR) .................. 10-2011-0141203

(51) Int. Cl.
| | | |
|---|---|---|
| *G11B 7/14* | (2012.01) | |
| *H02K 7/00* | (2006.01) | |
| *G11B 19/20* | (2006.01) | |
| *G11B 17/028* | (2006.01) | |

(52) U.S. Cl.
CPC ........... *H02K 7/003* (2013.01); *G11B 17/0282* (2013.01); *G11B 19/2045* (2013.01)

(58) Field of Classification Search
CPC .... H02K 7/003; G11B 17/028; G11B 17/0282
USPC ............. 310/67 R; 720/714, 704; 360/98.04, 360/99.01, 99.04, 99.08
See application file for complete search history.

(56) References Cited

U.S. PATENT DOCUMENTS

| | | | | |
|---|---|---|---|---|
| 6,205,111 B1 * | 3/2001 | Hayakawa | ......... | G11B 17/0282 360/99.12 |
| 2001/0038250 A1* | 11/2001 | Katagiri | .................. | H02K 1/30 310/67 R |
| 2011/0271292 A1* | 11/2011 | Yamane | ............ | B29C 45/14065 720/695 |
| 2012/0299437 A1* | 11/2012 | Nishikata | ........... | G11B 19/2009 310/216.137 |

FOREIGN PATENT DOCUMENTS

| | | | |
|---|---|---|---|
| JP | 60080102 A | * | 5/1985 |
| JP | H0955020 A | | 2/1997 |
| JP | 2001178078 A | | 6/2001 |
| JP | 2005063615 A | | 3/2005 |

OTHER PUBLICATIONS

JP 60080102 A abstract machine translation, Apr. 3, 2016.*
Office Action dated Jul. 19, 2016 in Japanese Application No. 2012278089.

* cited by examiner

*Primary Examiner* — Joshua Benitez-Rosario
*Assistant Examiner* — Leda Pham
(74) *Attorney, Agent, or Firm* — Saliwanchik, Lloyd & Eisenschenk

(57) ABSTRACT

A spindle motor having a turntable is disclosed, the spindle motor including a rotating rotation shaft, a turn table coupled to the rotation shaft to rotate along with the rotation shaft, and formed at a central upper surface with an accommodation groove, and a torque enhancement member coupled to the rotation shaft, and arranged inside the accommodation groove of the turn table to enhance a rotational torque of the turn table by depressing the turn table.

19 Claims, 6 Drawing Sheets

SPINDLE MOTOR

CROSS-REFERENCE TO RELATED APPLICATION

This application claims the benefit under 35 U.S.C. §119 of Korean Patent Application No. 10-2011-0141203, filed Dec. 23, 2011, which is hereby incorporated by reference in its entirety.

BACKGROUND

Field of the Invention

The present disclosure relates to a spindle motor.

Description of Related Art

Generally, a spindle motor, one of disk rotating devices, is widely used as an optical disk drive (ODD) and a hard disk drive for rotating an optical disk and a metal disk at a very high speed.

The spindle motor for rotating an optical disk in the ODD at a high speed includes a rotation shaft, a turn table rotating with the rotation shaft, and a center cone inserted into the rotation shaft to center the disk.

The spindle motor thus configured is reduced in thickness of turn table by the center cone, thereby reducing a coupling force between the turn table and the rotation shaft. The reduction in coupling force between the turn table and the rotation shaft may tilt the turn table, generate a rotational run-out, or greatly reduce a rotational torque of the turn table, whereby various problems including a rotational slip of the turn table may disadvantageously generated.

BRIEF SUMMARY

Exemplary embodiments of the present disclosure is to provide a spindle motor configured to reinforce a coupling force between a turn table and a rotation shaft, to inhibit a rotational run-out of the turn table, and to inhibit rotational slip of the turn table by enhancing a rotational torque of the turn table.

In one general aspect of the present disclosure, there is provided a spindle motor, the spindle motor comprising: a rotating rotation shaft; a turn table coupled to the rotation shaft to rotate along with the rotation shaft, and formed at a central upper surface with an accommodation groove; and a torque enhancement member coupled to the rotation shaft, and arranged inside the accommodation groove of the turn table to enhance a rotational torque of the turn table by depressing the turn table.

In another general aspect of the present disclosure, there is provided a spindle motor, the spindle motor comprising: a rotating rotation shaft; a turn table coupled to the rotation shaft to rotate along with the rotation shaft, and formed at a central upper surface with an accommodation groove; and a torque enhancement member coupled to the rotation shaft, and arranged inside the accommodation groove of the turn table to enhance a rotational torque of the turn table by depressing the turn table, wherein an upper surface of the turn table contacting the torque enhancement member is formed with a pedestal portion exposing an edge of a bottom surface of the torque enhancement member by distancing the torque enhancement member from the upper surface of the turn table.

In still another general aspect of the present disclosure, there is provided a spindle motor, the spindle motor comprising: a rotating rotation shaft; a turn table coupled to the rotation shaft to rotate along with the rotation shaft, and formed at a central upper surface with an accommodation groove; a torque enhancement member coupled to the rotation shaft, and arranged inside the accommodation groove of the turn table to enhance a rotational torque of the turn table; an adhesive arranged inside the accommodation groove; and an additional adhesive member interposed between the torque enhancement member and an upper surface of the turn table.

Technical problems to be solved by the present disclosure are not restricted to the above-mentioned, and any other technical problems not mentioned so far will be clearly appreciated from the following description by skilled in the art.

BRIEF DESCRIPTION OF THE DRAWINGS

Accompanying drawings are included to provide a further understanding of arrangements and embodiments of the present disclosure and are incorporated in and constitute a part of this application. In the following drawings, like reference numerals refer to like elements and wherein.

DETAILED DESCRIPTION

Figure 1:
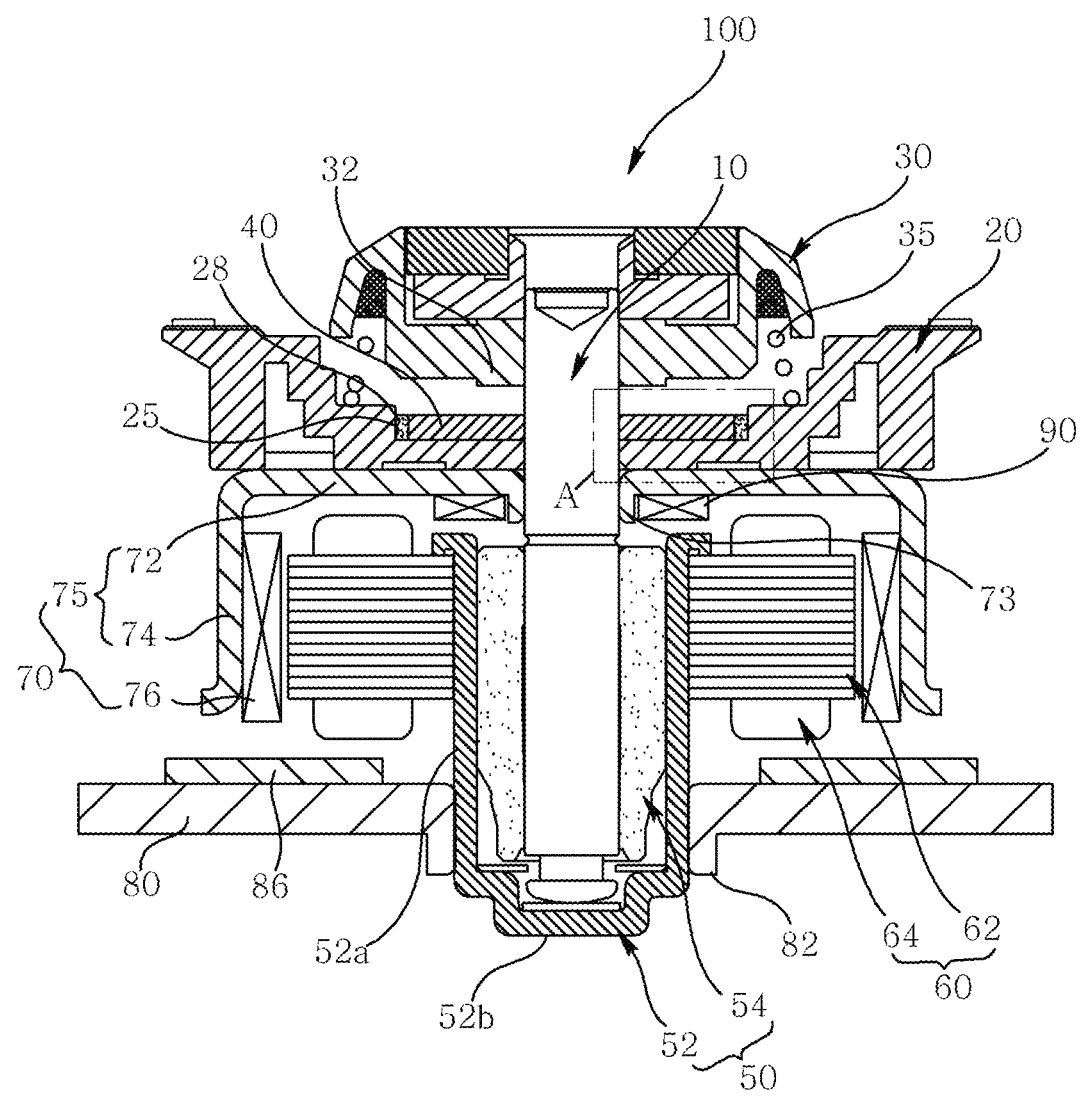
FIG. 1 is a cross-sectional view of a spindle motor according to an exemplary embodiment of the present disclosure.
Figure 2:
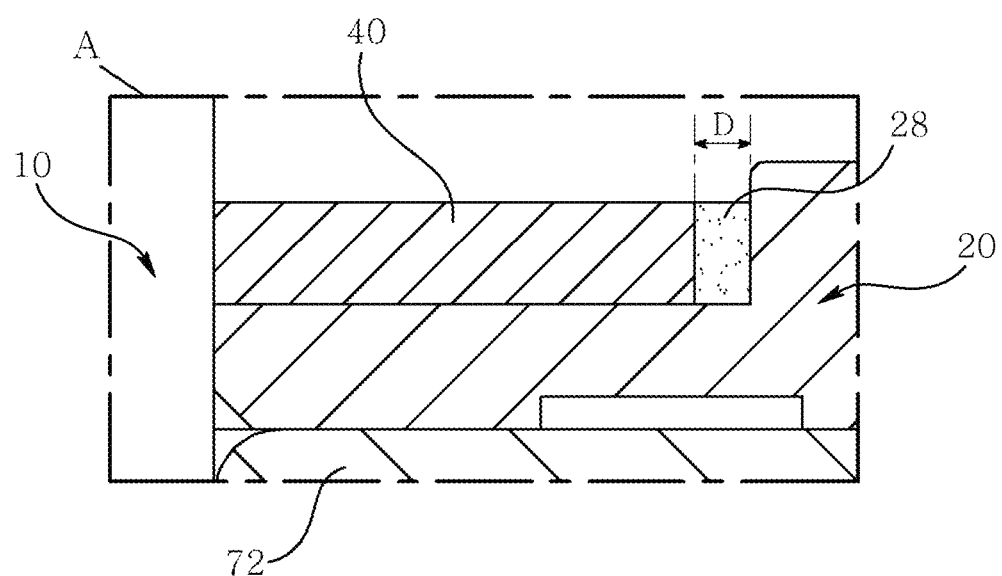
FIG. 2 is an enlarged view of 'A' part of FIG. 1.

FIG. 1 is a cross-sectional view of a spindle motor according to an exemplary embodiment of the present disclosure, and FIG. 2 is an enlarged view of 'A' part of FIG. 1.

Referring to FIGS. 1 and 2, a spindle motor (100) includes a rotation shaft (10), a turn table (20) and a torque enhancement member (40). In addition, the spindle motor (100) includes a center cone (30).

The rotation shaft (10) is rotatably fixed by a bearing assembly (50), the bearing assembly (50) is coupled by a stator (60), and the rotation shaft (10) is coupled by a rotor (70). The bearing assembly (50) includes a bearing housing (52) and a bearing (54).

The bearing housing (52) takes a shape of an upper surface-opened cylinder, for example, and may be formed by press-working a metal plate. The upper surface-opened bearing housing (52) includes a lateral plate (52a) and a floor plate (52b).

The lateral plate (52a) of the bearing housing (52) takes a shape of a cylinder, for example, and the floor plate (52b) is formed at a bottom surface of the lateral plate (52a). In an exemplary embodiment of the present disclosure, the lateral plate (52a) and the floor plate (52b) may be integrally formed by a deep drawing process using a press work. An upper surface of the lateral plate (52a) of the bearing housing (52) is bent toward an outside of the lateral plate (52a), and a bent portion serves to fix a core of the stator (60, described later) by depressing the core.

The bearing (54) is accommodated into an accommodation space formed on the bearing housing (52). The bearing

(54) takes a shape of pipe formed with a rotation shaft hole, and may include an oil-impregnated sintered bearing including an oil, for example.

The bearing housing (52) is coupled to a base plate (80). The base plate (80) is formed with a burring unit (82) which is in turn coupled to the lateral plate (52a) of the bearing housing (52). The base plate (80) is coupled at an upper surface thereof to a circuit board (86).

The stator (60) includes a core (62) and a coil (64). The core (62) is formed by stacking a plurality of thin iron pieces, and centrally formed with a through hole coupled to the lateral plate (52a) of the bearing housing (52). The coil (64) is wound on the core (62). The core (62) is contacted at an upper surface thereof by a flange unit bent from the lateral plate (52a) of the bearing housing (52), where the flange unit inhibits the core (62) from being separated from the lateral plate (52a) of the bearing housing (52).

The rotation shaft (10) is rotatably inserted into a rotation shaft hole of the bearing (54) accommodated into the bearing housing (52). A rotor (70) includes a yoke (75) and a magnet (70). The yoke (75) takes a shape of a bottom surface-opened cylinder. To be more specific, the yoke (75) includes a yoke upper plate (72) and a yoke lateral plate (74). The yoke upper plate (72) takes a shape of a thin disk and is centrally formed with a yoke burring unit (73). The yoke burring unit (73) is coupled to the rotation shaft (10), and the coupling of the yoke burring unit (73) to the rotation shaft (10) causes the yoke (75) to rotate along with the rotation shaft (10). The yoke lateral plate (74) is extended from an outer edge of the yoke upper plate (72) to a direction wrapping the core (62).

The magnet (74) is arranged at an inner surface of the yoke lateral plate (74). The magnet (74) is arranged opposite to a lateral surface of the core (62). The yoke (75) is rotated along with the rotation shaft (10) by forces generated by a magnetic field of the magnet (76) and generated by a magnetic field generated and induced by the coil (64).

A suction magnet (90) is arranged at a bottom surface of the yoke upper plate (72) of the yoke (75). The suction magnet (90) takes a shape of a circular ring when viewed in a top plan view.

As explained above, the rotation shaft (10) is rotated by interaction between the stator (60) and the rotor (70), and the rotation shaft (10) is coupled by the turn table (20). The turn table (20) takes a shape of a disk, and the turn table (20) functions to support an optical disk. The turn table (20) is press-fitted into the rotation shaft (10), and a bottom surface of the turn table (20) is arranged at an upper surface of the yoke upper plate (72) of the yoke (75). The bottom surface of the turn table (20) opposite to the yoke upper plate (72) of the yoke (75) may be formed with an adhesive accommodation groove accommodating an adhesive for enhancing a coupling force of the yoke (75) and the turn table (20) by adhering the yoke (75) and the turn table (20).

The rotation shaft is inserted by a center cone (30) for aligning a rotational center of the optical disk to a rotational center of the rotation shaft (10), after the turn table (20 is press-fitted into the rotation shaft (10). The center cone (30) moves to an axial direction of the rotation shaft (10). A coil spring (35) is interposed between the center cone (30) and the turn table (20), and the center cone (30) is elastically supported on the turn table (20) by a coil spring (35).

Meanwhile, in a case the center cone (30) is arranged at an upper surface of the turn table (20), a thickness of the turn table (20) is relatively and thinly formed by the center cone (30), whereby a coupling force between the turn table (20) and the rotation shaft (10) is weakened.

Particularly, in a case the turn table (20) is an injection molding product formed by a synthetic resin molding method, the turn table (20) is deformed after being press-fitted into the rotation shaft (10), to greatly reduce the coupling force between the rotation shaft (10) and the turn table (20), whereby the turn table (20) may be slipped relative to the rotation shaft (10). In a case the turn table (20) is slipped relative to the rotation shaft (10), a fatal data read error or a data write error may be generated, whereby a rotation run-out which is an unbalanced rotation may be generated, or vibration of the turn table (20) may be greatly increased.

In order to enhance a rotational torque of the turn table by increasing the coupling force between the turn table (20) and the rotation shaft (10), the rotation shaft (10) is coupled by a torque enhancement member (40), and the torque enhancement member (40) depresses the turn table (20) to allow the turn table (20) to be fixed in between the yoke (75) and the torque enhancement member (40).

A concave accommodation groove (25) is formed at an upper surface of the turn table (20) for accommodating the torque enhancement member (40, described later). An inner surface f the turn table (20) formed by the accommodation groove (25) is arranged opposite to an outer surface of the torque enhancement member (40).

Referring to FIG. 2, the torque enhancement member (40) is arranged inside the accommodation groove (25) of the turn table (20) after being inserted into the rotation shaft (10), to increase the coupling force between the turn table (20) and the rotation shaft (10) and the rotational torque.

In an exemplary embodiment of the present disclosure, the torque enhancement member (40) may take a shape of a circular ring. To be more specific, the torque enhancement member (40) may include a metal ring having a hollow hole into which an outer surface of the rotation shaft (10) is inserted.

In an exemplary embodiment of the present disclosure, the torque enhancement member (40) of the metal ring shape may be press-fitted into the outer surface of the rotation shaft (10), whereby a bottom surface of the torque enhancement member (40) depresses the upper surface of the upper surface of the turn table (20). The torque enhancement member (40) is press-fitted into an outer surface of the rotation shaft (10), and the bottom surface of the torque enhancement member (40) is closely brought into contact with the upper surface of the turn table (20) formed by the accommodation groove (25) of the turn table (20).

The close contact of the torque enhancement member (40) to the upper surface of the turn table (20) causes the turn table (20) to be interposed between the torque enhancement member (40) and the yoke (75), and frictional force between the torque enhancement member (40) and the yoke (75) greatly increases the rotational torque between the turn table (20) and the rotation shaft (10).

Meanwhile, a gap (D) formed between an inner surface of the turn table (20) and an outer surface of the torque enhancement member (40) by the accommodation groove (25) of the turn table (20) is preferably less than approximately 3 mm. In a case the gap (D) formed between the inner surface of the turn table (20) and the outer surface of the torque enhancement member (40) by the accommodation groove (25) of the turn table (20) is more than 3 mm, an amount of an adhesive accommodated in a space between the inner surface of the turn table (20) and the outer surface of the torque enhancement member (40) is increased.

Meanwhile, in order to maximize the coupling force between the turn table (20) and the rotation shaft (10) and rotational torque using the torque enhancement member (40), the outer surface of the torque enhancement member (40) is preferably press-fitted into the inner surface of the turn table (20) formed by the accommodation groove (25) of the turn table (20).

In a case the outer surface of the torque enhancement member (40) is press-fitted into the inner surface of the turn table (20) formed by accommodation groove (25) of the turn table (20), the rotation shaft (10) and the turn table (20) is very tightly coupled with a strong coupling force of and by the torque enhancement member (40).

Meanwhile, in a case the gap (D) formed between the inner surface of the turn table (20) and the outer surface of the torque enhancement member (40) by the accommodation groove (25) of the turn table (20) is less than approximately 3 mm, the gap (D) is provided with an adhesive (28), the inner surface of the turn table (20) and the outer surface of the torque enhancement member (40) may be adhered by the adhesive (28) to greatly increase the coupling force between the turn table (20) and the rotation shaft (10) and rotations torque of the turn table (20).

Figure 3:
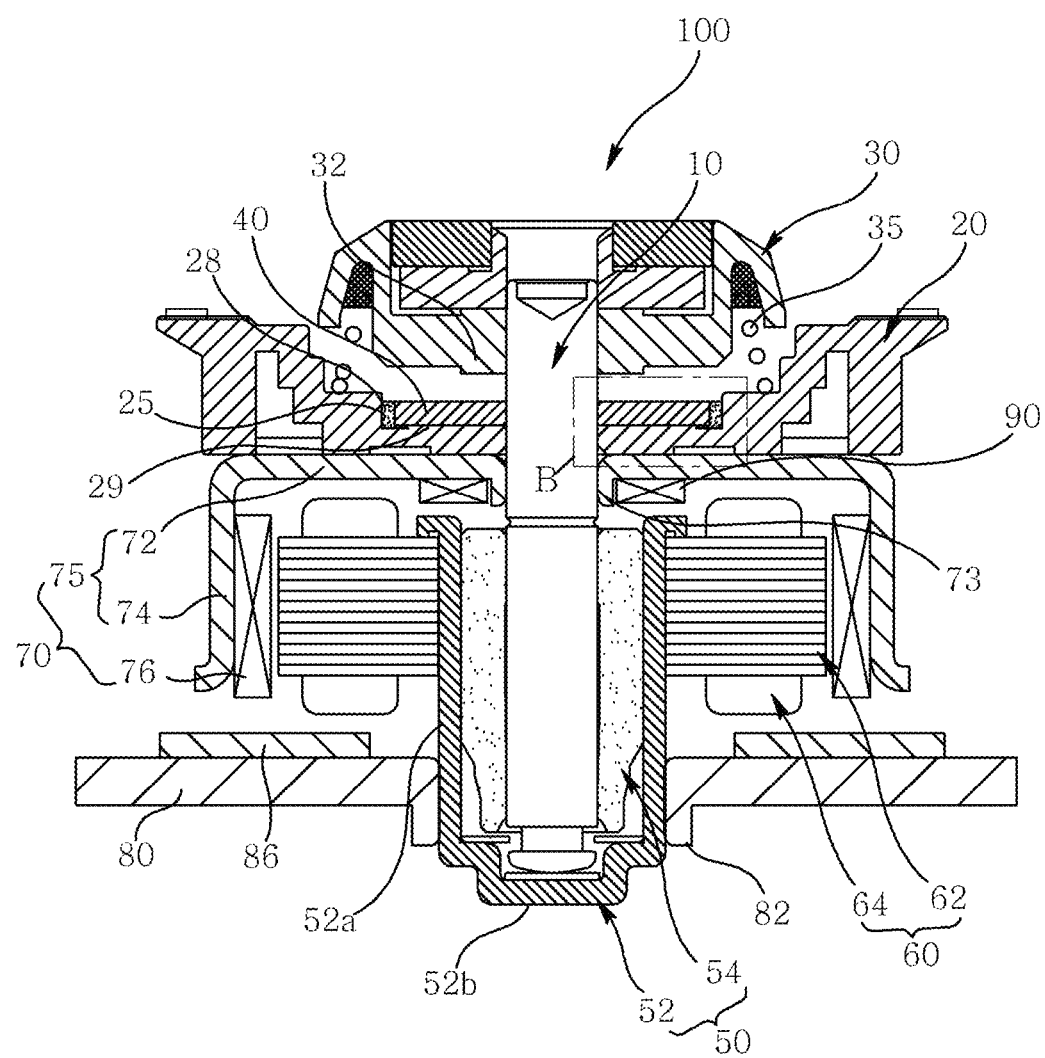
FIG. 3 is a cross-sectional view of a spindle motor according to another exemplary embodiment of the present disclosure.
Figure 4:
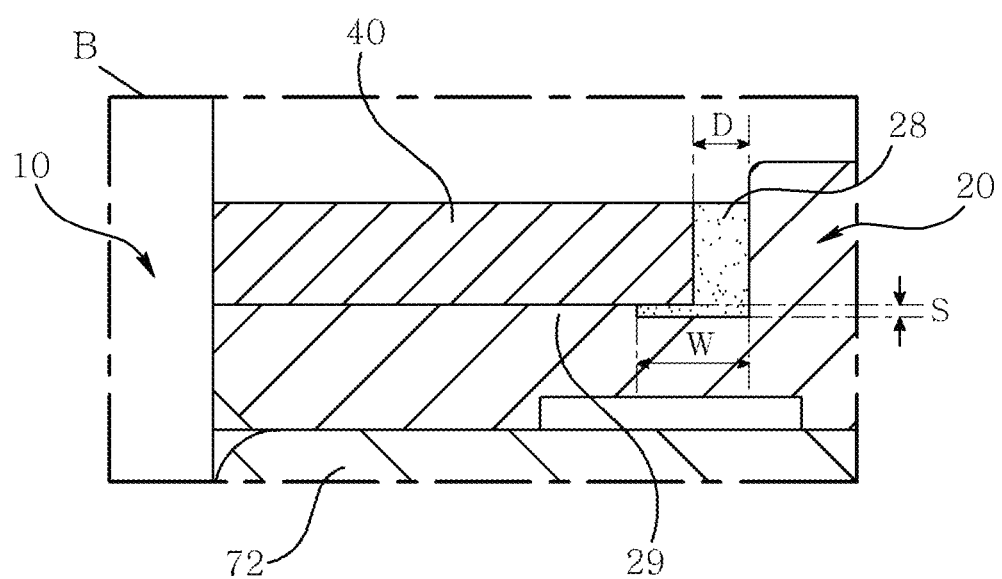
FIG. 4 is an enlarged view of 'B' part of FIG. 3.

FIG. 3 is a cross-sectional view of a spindle motor according to another exemplary embodiment of the present disclosure, and FIG. 4 is an enlarged view of 'B' part of FIG. 3.

Referring to FIGS. 3 and 4, the spindle motor according to another exemplary embodiment of the present disclosure is substantially same as that of FIGS. 1 and 2 except for a pedestal portion, such that in the following description, like reference numerals refer to like elements and redundant configuration will be omitted.

Referring to FIGS. 3 and 4, a spindle motor (100) includes a rotation shaft (10), a turn table (20) and a torque enhancement member (40). In addition, the spindle motor (100) includes a center cone (30). A pedestal portion (29) distancing the torque enhancement member (40) from the turn table (20) at a predetermined distance is protrusively formed at a portion corresponding to the torque enhancement member (40) at an upper surface of the turn table (20). The pedestal portion (29) takes a shape of a dough nut when viewed from a plane view, and an outer diameter of the pedestal portion (29) is formed smaller than the outer diameter of the torque enhancement member (40).

Thus, a bottom surface of the torque enhancement member (40) is formed with a space (S) distanced from the upper surface of the turn table (20) by the pedestal portion (29). The space (S) between the bottom surface of the torque enhancement member (40) and the upper surface of the turn table (20) by the pedestal portion (29) is filled with an adhesive mutually adhering the turn table (20) and the torque enhancement member (40), and adhesion of the outer surface and the bottom surface of the torque enhancement member (40) by the adhesive can greatly enhance a coupling strength between the turn table (20) and the rotation shaft (10) and a rotational torque of the rotation shaft (10).

In an exemplary embodiment of the present disclosure, a width (W) between the outer surface of pedestal portion (29) and an inner surface formed by the accommodation groove (25) of the turn table (20) is preferably less than approximately 3 mm, and a height of the space (S) formed by the height of the pedestal portion (29) is preferably less than approximately 0.4 mm.

In a case the width (W) between the outer surface of pedestal portion (29) and an inner surface formed by the accommodation groove (25) of the turn table (20) is more than approximately 3 mm, an area of the pedestal portion (29) may be reduced to weaken a coupling force between the pedestal portion (29) and the torque enhancement member (40).

Meanwhile, in a case the height of the space (S) formed by the height of the pedestal portion (29) is more than approximately 0.4 mm, an excessive amount of adhesive may be filled between the turn table (20) and the torque enhancement member (40) to reduce an adhesive force.

Figure 5:
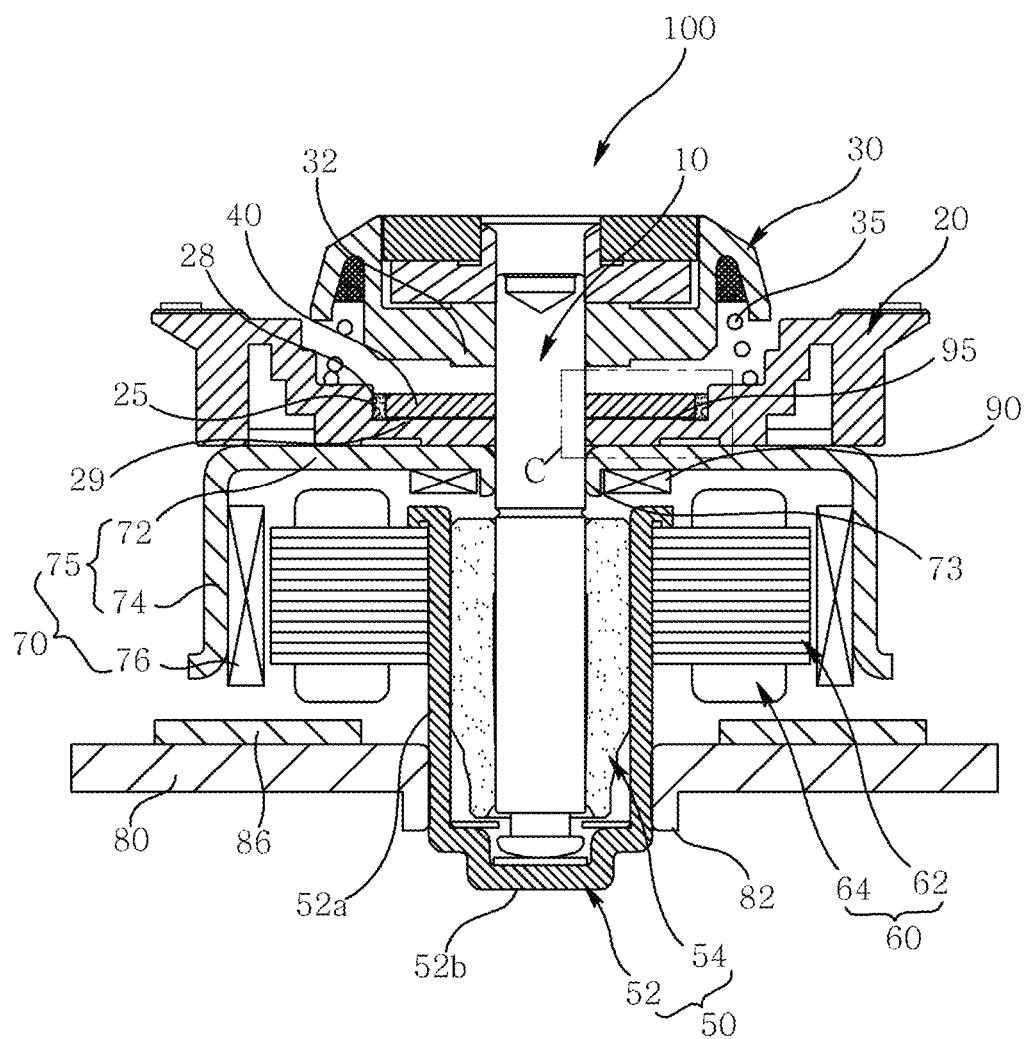
FIG. 5 is a cross-sectional view of a spindle motor according to still another exemplary embodiment of the present disclosure.
Figure 6:
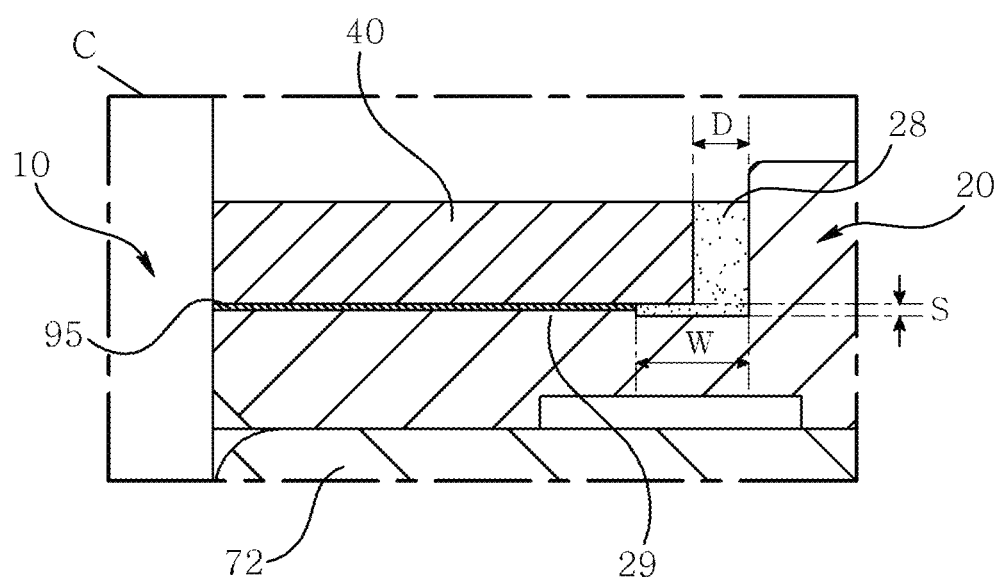
FIG. 6 is an enlarged view of 'C' part of FIG. 5.

FIG. 5 is a cross-sectional view of a spindle motor according to still another exemplary embodiment of the present disclosure, and FIG. 6 is an enlarged view of 'C' part of FIG. 5.

Referring to FIGS. 5 and 6, the spindle motor according to still another exemplary embodiment of the present disclosure is substantially same as that of FIGS. 3 and 4 except for an additional adhesive, such that in the following description, like reference numerals refer to like elements and redundant configuration will be omitted.

Referring to FIGS. 5 and 6, a spindle motor (100) includes a rotation shaft (10), a turn table (20) and a torque enhancement member (40). In addition, the spindle motor (100) includes a center cone (30).

An additional adhesive (95) is arranged between an upper surface of the pedestal portion (29) arranged at the upper surface of the turn table (20) of the spindle motor (100) and a bottom surface of the torque enhancement member (40) opposite to the upper surface of the pedestal portion (29). The additional adhesive (95) attaches the torque enhancement member (40) to the pedestal portion (29) of the turn table (20) to further enhance a coupling force between the turn table (20) and the rotation shaft (10) and a rotational torque of the turn table (20).

As apparent from the foregoing, the spindle motor according to the present disclosure has an advantageous effect in that an upper surface of a turn table coupled to a rotation shaft is coupled by the rotation shaft and a torque enhancement member configured to enhance a coupling force of the turn table and to improve a rotational torque of the turn table to thereby inhibit the turn table from generating a rotational run-out and a vibration.

Although the present disclosure has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A spindle motor, the spindle motor comprising:
a rotating rotation shaft;
a turn table coupled to the rotation shaft to rotate along with the rotation shaft, and formed at a central upper surface with an accommodation groove;
a torque enhancement member coupled to the rotation shaft, and arranged inside the accommodation groove of the turn table; and
a yoke in direct physical contact with the turn table opposite the torque enhancement member,
wherein the torque enhancement member is passed against the turn table creating frictional force between the torque enhancement member and the turn table and between the turn table and the yoke, resulting in increased rotational torque.

2. The spindle motor of claim 1, wherein the torque enhancement member is press-fitted into the rotation shaft.

3. The spindle motor of claim 1, wherein the torque enhancement member takes a shape of a circular ring.

4. The spindle motor of claim 1, wherein the torque enhancement member includes a metal ring.

5. The spindle motor of claim 1, further comprising
a bearing assembly including a bearing rotatably supporting the rotation shaft and a bearing housing accommodating the bearing;
a stator including a core coupled to a periphery of the bearing housing and a coil wound on the core; and
a rotor including a yoke inserted into the rotation shaft to support the turn table and a magnet mounted on the yoke to face the core.

6. The spindle motor of claim 1, wherein a gap between an inner surface of the turn table formed by the accommodation groove and an outer surface of the torque enhancement member is less than 3 mm.

7. The spindle motor of claim 6, wherein the inner surface of the turn table is press-fitted into the outer surface of the torque enhancement member.

8. The spindle motor of claim 1, wherein spindle motor further comprises an adhesive filled between the accommodation groove and the torque enhancement member.

9. A spindle motor, the spindle motor comprising:
a rotating rotation shaft;
a turn table coupled to the rotation shaft to rotate along with the rotation shaft, and formed at a central upper surface with an accommodation groove; and
a torque enhancement member coupled to the rotation shaft, and arranged inside the accommodation groove of the turn table to enhance a rotational torque of the turn table by depressing the turn table;
wherein the turn table is formed with a pedestal portion contacting the torque enhancement member such that a bottom outer edge of the torque enhancement member is spaced apart from an upper surface of the turn table.

10. The spindle motor of claim 9, wherein a height of the pedestal portion is 0.4 mm.

11. The spindle motor of claim 9, wherein a gap between an inner surface of the turn table formed by the accommodation groove and an outer surface of the pedestal portion is less than 3 mm.

12. A spindle motor, the spindle motor comprising:
a rotating rotation shaft;
a turn table coupled to the rotation shaft to rotate along with the rotation shaft, and formed at a central upper surface with an accommodation groove;
a torque enhancement member coupled to the rotation shaft, and arranged inside the accommodation groove of the turn table to enhance a rotational torque of the turn table;
an adhesive arranged inside the accommodation groove; and
an additional adhesive member that completely covers an interface between the torque enhancement member and an upper surface of the turn table,
wherein the turn table is formed with a pedestal portion contacting the torque enhancement member such that a bottom outer edge of the torque enhancement member is spaced apart from an upper surface of the turn table.

13. The spindle motor of claim 12, wherein the torque enhancement member is press-fitted into the rotation shaft.

14. The spindle motor of claim 12, wherein the torque enhancement member takes a shape of a circular ring.

15. The spindle motor of claim 12, wherein the torque enhancement member includes a metal ring.

16. The spindle motor of claim 12, further comprising:
a bearing assembly including a bearing rotatably supporting the rotation shaft and a bearing housing accommodating the bearing;
a stator including a core coupled to a periphery of the bearing housing and a coil wound on the core; and
a rotor including a yoke inserted into the rotation shaft to support the turn table and a magnet mounted on the yoke to face the core.

17. The spindle motor of claim 12, wherein a gap between an inner surface of the turn table formed by the accommodation groove and an outer surface of the torque enhancement member is less than 3 mm.

18. The spindle motor of claim 17, wherein the outer surface of the torque enhancement member is press-fitted into the inner surface of the turn table.

19. The spindle motor of claim 12, wherein a gap between an inner surface formed by the accommodation groove and an outer surface of the pedestal portion is less than 3 mm.

* * * * *